United States Patent [19]
Kikuta

[11] Patent Number: 5,427,060
[45] Date of Patent: Jun. 27, 1995

[54] SCREEN FOR AQUARIUM TANK
[75] Inventor: Toshiki Kikuta, Tokyo, Japan
[73] Assignee: Nisso Industry Co., Ltd., Tokyo, Japan
[21] Appl. No.: 216,308
[22] Filed: Mar. 23, 1994
[30] Foreign Application Priority Data
Mar. 24, 1993 [JP] Japan .................. 5-019102 U
[51] Int. Cl.⁶ .................................... A01K 63/06
[52] U.S. Cl. ........................ 119/248; 119/253; 119/269
[58] Field of Search ............... 119/245, 246, 247, 249, 119/253, 259, 269

[56] References Cited
U.S. PATENT DOCUMENTS

| | | | |
|---|---|---|---|
| 3,149,608 | 9/1964 | Murphy | 119/253 |
| 3,232,272 | 2/1966 | Jose et al. | 119/269 |
| 3,288,110 | 11/1966 | Goldman et al. | 119/248 |
| 3,390,665 | 7/1968 | Wininger | 119/254 |
| 3,515,097 | 6/1970 | Sherman | 119/269 |
| 3,731,090 | 5/1973 | Veloz | 119/245 |
| 4,064,837 | 12/1977 | Montgomery | 119/248 |
| 4,844,013 | 7/1989 | Haan et al. | 119/248 |
| 5,306,421 | 4/1994 | Weinstein | 119/248 |

Primary Examiner—Paul J. Hirsch
Attorney, Agent, or Firm—Oblon, Spivak, McClelland, Maier & Neustadt

[57] ABSTRACT

A screen is used for an aquarium tank having a tank body, a filter unit disposed on the tank body, a case for the filter unit, and a pump mechanism having a water conducting section extending into the tank body from the underside of the case. The screen is configured so as to conceal the water conducting section at least from the front and opposite sides of the tank.

3 Claims, 4 Drawing Sheets

SCREEN FOR AQUARIUM TANK

BACKGROUND OF THE INVENTION

1. Field of the Invention

This invention relates to a screen for an aquarium tank and, more particularly, to a screen which is disposed in an aquarium tank for enhancing the appearance of the tank interior.

2. Description of the Prior Art

FIG. 5 shows a prior art aquarium tank. As shown, the tank comprises a tank body 51, over which a filter unit 52 is disposed. The filter unit 52 has a base frame 54 which is placed on an upper frame 53 of the tank body. A filter tank 55 and a pump mechanism 56 are mounted on the base frame 54. A filter chamber 57 and a float chamber 58 are formed in the filter tank 55. Water is drawn from the tank by the pump mechanism 56 and supplied to and filtered through a filter material 59 in the filter chamber 57, and the filtered water is returned through the float chamber 58 and down through a return pipe 60 into the tank. In the filter chamber 57, a drain board 61 is laid so as to be spaced apart from the bottom of the chamber. The filter material 59 is placed on the drain board 61. Over the filter material 59, a distributing trough 62 exends in the longitudinal direction (to the left and right in FIG. 5) of the filter chamber 57. Water discharged from a discharge nozzle 63a of a delivery pipe 63 of the pump mechanism 56 first flows into the distributing trough 62 to be distributed uniformly over the filter material 59 through many distributing holes (not shown) formed in the bottom of the trough. The filtered water from the filter material 59 flows through a passage formed between the drain board 61 and the bottom of the chamber 57 to enter the float chamber 58 and thence return through the return pipe 60 and an outlet 64 into the tank.

The pump mechanism 56, which pumps water from the tank body 51 to the filtering section (i.e., the filter chamber 57 with the filter material 59 placed therein) comprises a motor 65 mounted in the filter unit 52, a cylindrical member 66 through which a motor shaft (not shown) extends downward from the motor 65 into the interior of the tank body 51, an intermediate frame 67 provided at the lower end of the cylindrical member 66 and rotatably accommodating a vane (not shown) mounted at the lower end of the motor shaft, an extension pipe 68 extending from the intermediate frame 67 to communicate with the delivery pipe 63 and having its lower end open in the tank interior, and a strainer 69 mounted on the lower end of the pipe 68 and serving to prevent comparatively large particles from being drawn into the pipe 68. The water conducting section of the pump mechanism 56, which comprises the delivery pipe 63, the cylindrical member 66, the intermediate frame 67, the extension pipe 68, the strainer 69, etc., extends from the underside of the case of the filter unit 52 into the tank body 51. A heater 70 for regulating the temperature of the water in the tank is disposed at the bottom of the tank body 51 (for instance, on gravel spread on the tank bottom).

In the prior art aquarium tank described above, the water conducting section of the pump mechanism extends down from the filter unit case underside and therefore spoils the appearance of the tank interior. This detracts from the observer's aesthetic impression of the aquarium tank and the fish and plants kept in it.

SUMMARY OF THE INVENTION

The object of the invention, is therefore to prevent the appearance of the tank interior from being degraded by the water conducting section extending down from the underside of the filter unit case and thereby to enhance the observer's esthetic impression.

According to the invention, a screen for an aquarium tank, having a tank body and a pump mechanism water conducting section extending into the tank body from the underside of a case of a filter unit disposed on the tank body, the screen being configured to conceal the water conducting section at least from the front and opposite sides.

With the screen disposed to conceal at least the front and opposite sides of the pump mechanism water conducting section extending into the tank from the filter unit case underside, the pump mechanism water conducting section is hidden from the view of the observer at least from the front and opposite sides of the tank.

The above and other features of the invention will become apparent from the following description made with reference to the accompanying drawings.

DESCRIPTION OF THE PREFERRED EMBODIMENT

A screen for an aquarium tank embodying the invention will now be described in detail with reference to the accompanying drawings.

Figure 1:
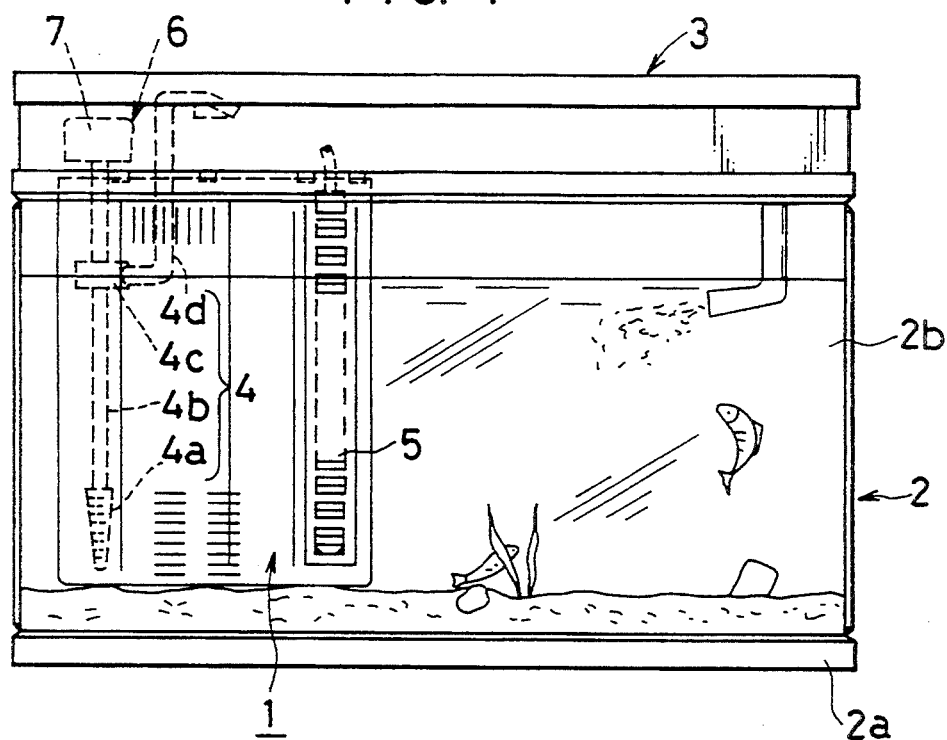
FIG. 1 is a front view of an aquarium tank with a screen which is an embodiment of the invention.
Figure 2:
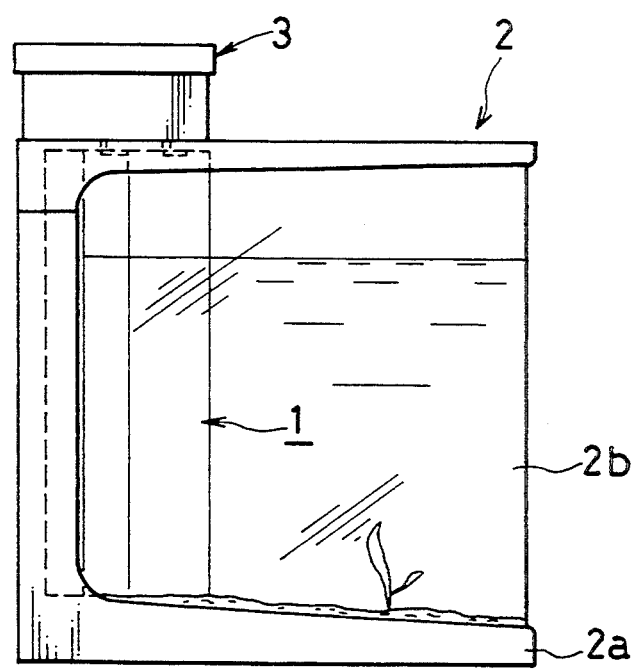
FIG. 2 is a side view of the aquarium tank with a screen.

As shown in FIGS. 1 and 2, a screen 1 is suspended into the tank from a suitable portion of the underside of a case of a filter unit 3 disposed over a tank body 2 and is positioned so as to conceal at least the front and opposite sides of a pump mechanism water conducting section 4 extending into the tank from the underside of the case of the filter unit 3. In this embodiment, the screen 1 is capable of accommodating a rod heater 5. The water conducting section 4 is part of a pump mechanism 6 which pumps water from the tank to a filter section in the filter unit 3. Specifically, it serves to conduct water from the tank to the filter section in the filter unit 3 disposed over the tank body 2. It includes a strainer 4a, an extension pipe 4b, an intermediate frame 4c, a delivery pipe 4d etc. The pump mechanism 6 is driven by a motor 7 accommodated in the filter unit 3.

Figure 3:
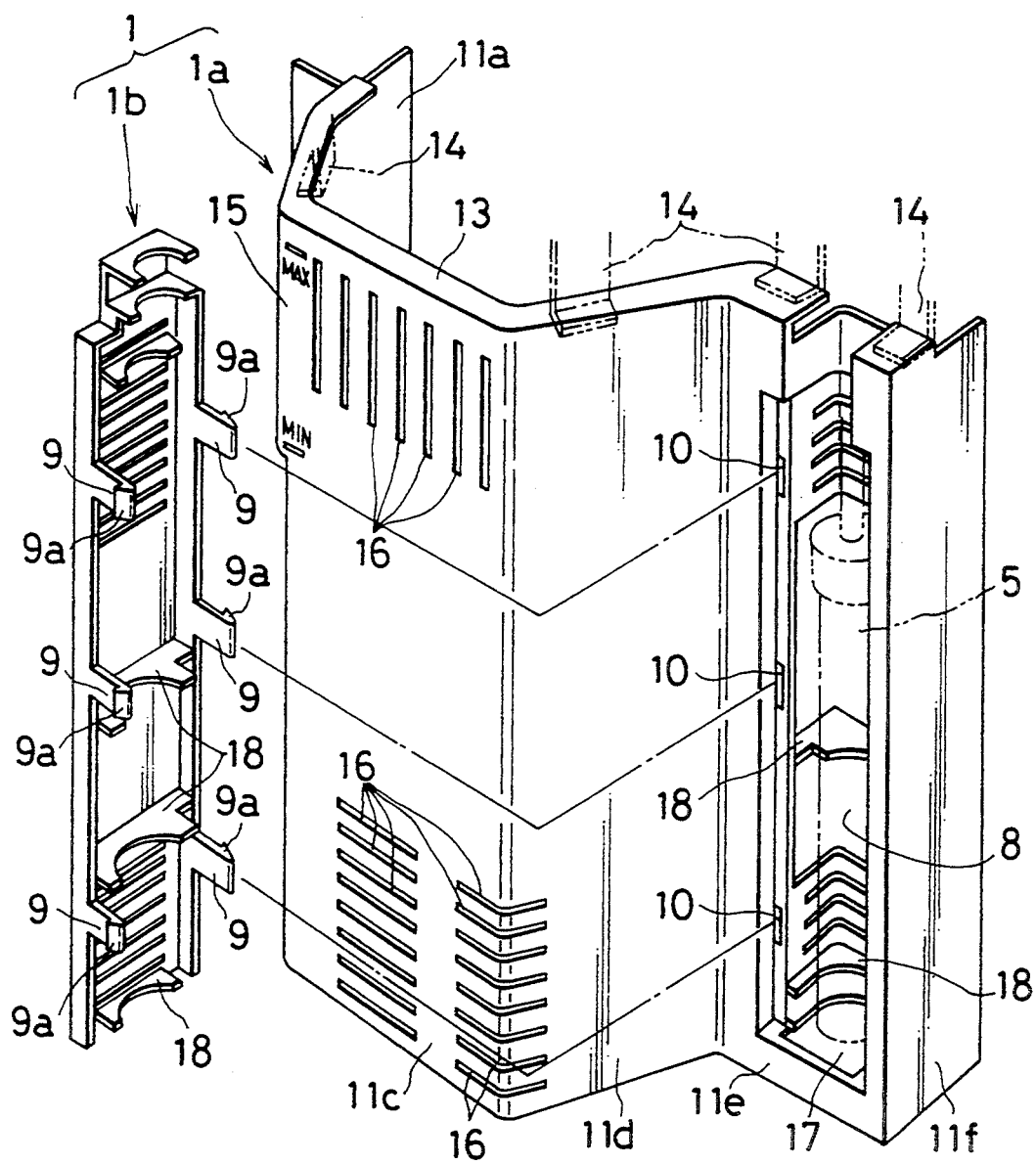
FIG. 3 is an exploded perspective view showing the screen with its panel and cover disassembled.

As shown in FIG. 3, this embodiment of the screen 1 comprises a panel 1a and a cover 1b, both made of synthetic resin. The cover 1b is for covering the front opening of a heater housing 8 provided in a suitable portion of the panel 1a. When the front opening of the heater housing 8 is covered by the cover 1b with the heater 5 accommodated in the heater housing 8, the heater 5 is shielded from the view of a person observing the aquarium tank at least from the front and opposite sides of the tank. For engagement and disengagement of the panel 1a and the cover 1b, in this embodiment the opposite sides of the cover 1b are provided at suitable positions with a suitable number of engagement pieces 9, while the panel 1a is provided with engagement holes 10 corresponding to the engagement pieces 9. When the engagement pieces 9 of the cover 1b are inserted into the engagement holes 10 in the panel 1a, a claw 9a formed at the end of each engagement piece 9 passes through the associated engagement hole 10 and catches on the edge of the hole 10, thus preventing detachment of the engagement piece 9 from the engagement hole 10. Thus, the cover 1b can be firmly mounted on the panel 1a. The cover 1b can be removed from the panel 1a by releasing the engagement between the claws 9a and the edges of the engagement holes 10.

Figure 4:
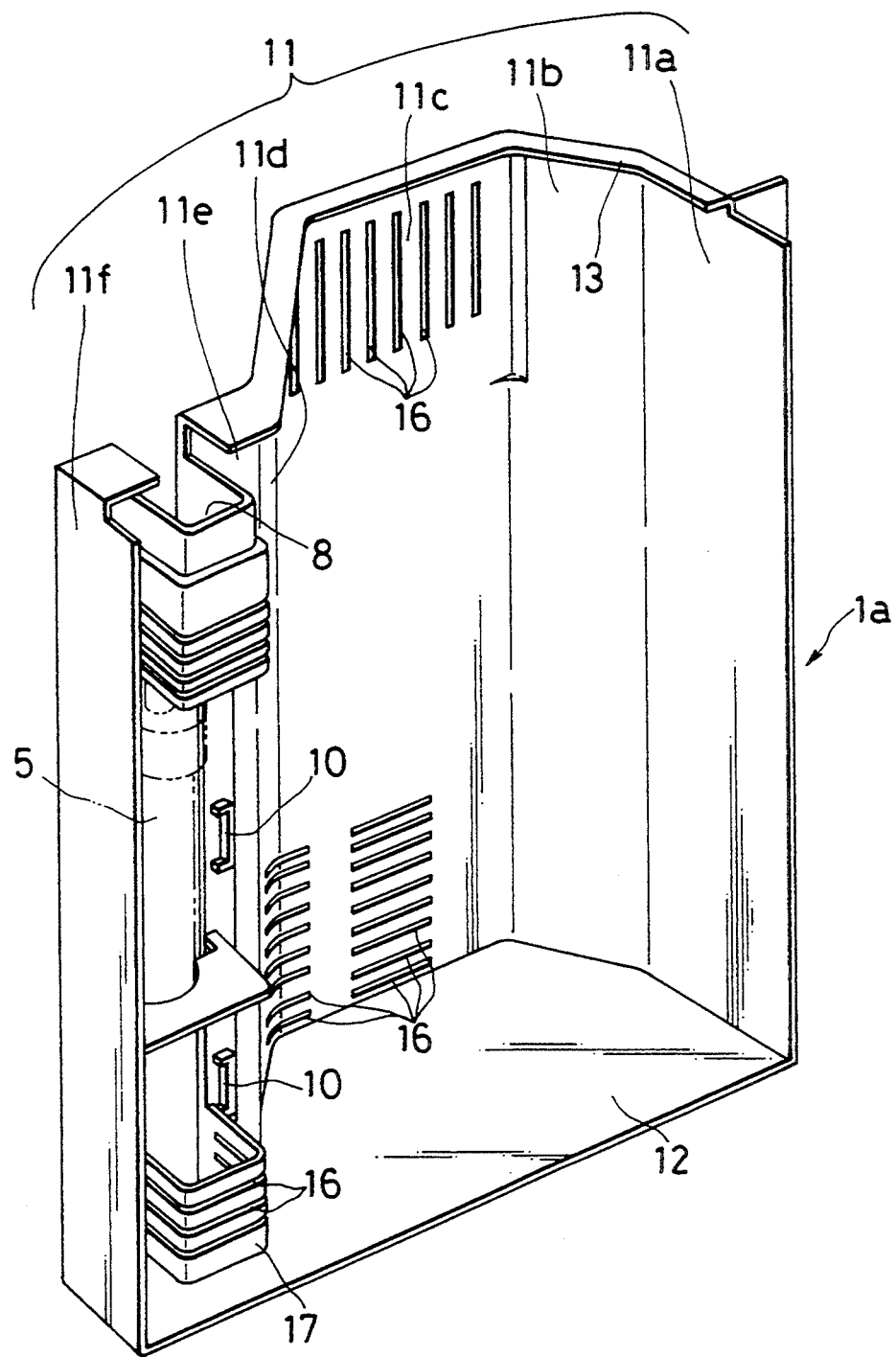
FIG. 4 is a rear perspective view showing the panel of FIG. 3.
Figure 5:
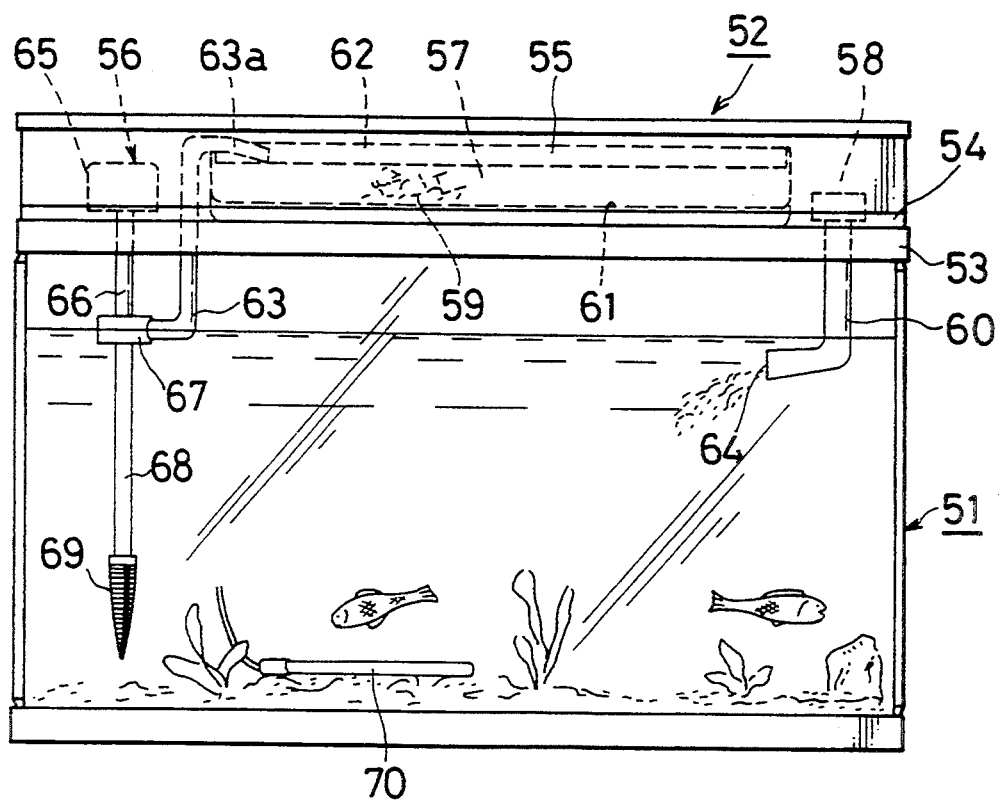
FIG. 5 is a front view of a prior art aquarium tank.

As shown in detail in FIG. 4, the cover panel 1a has a number of side walls formed as if by bending a flat sheet into a desired shape (in the illustrated example, so as to have first to sixth side walls 11a to 11f) and a bottom wall 12 extending horizontally from the lower edge of the side walls 11. The panel 1a is thus open on the back and at the top. The shape of the screen 1 is not limited to that in this embodiment and any shape is possible so long as it can conceal at least the front and opposite sides of the water conducting section 4 extending into the tank from the underside of the case of the filter unit 3. Thus, various designs are possible. For instance, it is possible to form the side wall into a single cylindrical surface corresponding to the shape of the water conducting section 4 or into a configuration resembling a large rock. It is also possible to dispense with the bottom wall 12 so as to provide a panel which is open at both the top and bottom. Further, for an aquarium tank intended to be observed from four sides, the water conducting section may be enclosed entirely with a continuous and endless side enclosure of a given shape obtained by combining a plurality of panels. Further, it is possible to configure a screen comprising two or more panels which are slidable vertically relative to one another. This provides increased versatility since it makes it possible to adjust the height of the screen according to the depth of the tank body 2 or the length of the water conducting section 4 extending from the underside of the case of the filter unit 3.

As has been shown, this embodiment of the screen 1 can conceal the water conducting section 4 of the pump mechanism 6 extending into the tank from the underside of the case of the filter unit 3, at least from the front and opposite sides, so that the water conducting section 4 of the pump mechanism 6 is hidden from the observer at least from the front and opposite sides of the tank. It is thus possible to effectively prevent the water conducting section 4 from spoiling the appearance of the tank interior and to enhance the observer's aesthetic impression of the aquarium tank.

In the foregoing embodiment, the screen 1 is disposed in the tank with the underside of a U-shaped support portion 13, which extends substantially horizontally backward from the upper edge of the panel 1a of the screen 1, on support members 14 formed at suitable locations on the underside of the case of the filter unit 3. However, it is possible instead to mount the screen 1 directly on the tank body 2 (for instance by providing the screen 1 and the tank body 2 with engagement members). In the case of mounting the screen 1 on the filter unit 3, it is possible to maintain its positional relationship with the water conducting section 4, which is better for concealing the water conducting section 4 from the view of the observer.

Further, the aforesaid embodiment of the screen 1 has an indicator 15 with marks indicating the water level in the tank. The indicator 15 is provided at a position readily observable from the front of the water tank, for instance, at the upper left portion of the third side wall portion 11c (FIG. 3). The indicator 15 makes it easy to ascertain whether the amount of water in the tank is proper (i.e., neither exceeding the maximum permissible nor less than the minimum necessary). The indicator 15 may be provided not only on the third side wall portion 11c but also on one or more of the other side walls 11a, 11b, 11d, 11e and 11f so as to be readable from various directions. Further, instead of providing a specific indicator or indicators, it is possible to provide a horizontally row of appropriately spaced verical slits 16 in the side wall 11 for use as a gage of the water level in the tank.

The fifth side wall portion 11e, in which the heater housing 8 is formed, has a front opening which can be closed by the cover 1b. The heater housing 8 has a heater holder 17 with a bottom. The heater housing 8 and the cover 1b are provided with holder members 18 each having an arcuate notch matched to the diameter of the rod heater 5. The heater 5 thus can be stably accommodated in the heater housing 8 by placing it on the heater holder 17 and then fitting the cover 1b on the panel 1a. However, if the heater housing 8 is suitably partitioned by the holder members 8 as in this embodiment, it becomes possible to house a heater and a temperature sensor together constituting an auto-heater (i.e., a heater combining a heating section with an integral temperature sensor or other such temperature control member) in separate ones of the partitioned spaces of the heater housing 8. In this case, the ordinary auto-heater having its temperature sensor located between its power cord and the heating section can be accommodated in the heater housing 8 with the power cord side at the top, because water heated in the auto-heater heating section is prevented by the holder members 18 from reaching the temperature sensor section. This makes it possible to prevent the heat producing operation of the auto-heater from being stopped before the average water temperature in the tank has reached the desired level.

The holder members 18 need not be molded integrally with the heater housing 8 and cover 1b, but may be produced as separate members and mounted on the heater housing 8 and cover 1b. Since this makes it possible to use mounting holder members which conform to the size and shape of the heater 5, the heater 5 can be accommodated more stably. The holder members 8 are made of a suitable heat-resistant or heat insulating material.

As has been described in the foregoing, the screen for an aquarium tank according to the invention can conceal at least the front and opposite sides of the water conducting section of the pump mechanism extending into the tank from the filter unit case underside, thus shielding the pump mechanism water conducting section from view of the observer at least from the front and opposite sides of the tank. It is thus possible to provide a practical screen for an aquarium tank which can prevent the appearance of the tank interior from being degraded by the water conducting section extending into the tank from the filter unit case and thereby enhance the observer's esthetic impression.

Japanese Utility Model Registration Application No. 5-19102 filed Mar. 24, 1993 is hereby incorporated by reference.

What is claimed is:

1. A screen for an aquarium tank, which has a case disposed over the tank within which a filter unit is located and including a heater and a pump mechanism water conducting section, comprising:
    a screen body formed from a flat sheet so as to have opposite sides and a substantially inverted U-shaped center;
    a partition compartment formed on one of the opposite sides of the screen body, the partition compartment concealing the pump mechanism water conducting section from the front and opposite sides and the water conducting section extending into the aquarium tank from the underside of the case for the filter unit disposed over the tank;
    a housing having an opening, the housing being formed on the other of the opposite sides of the screen body for vertically accommodating the heater; and
    a detachable cover for covering the opening of the housing for the heater.

2. A screen for an aquarium tank according to claim 1, wherein said filter unit and said screen are provided with engagement sections for engagement with and disengagement from each other, said screen being mountable on and dismountable from said filter unit.

3. The screen for an aquarium tank according to claim 1, which includes an indicator positioned on said screen indicating the water level in said tank.

* * * * *